(12) United States Patent
Hulsey

(10) Patent No.: US 7,032,090 B2
(45) Date of Patent: Apr. 18, 2006

(54) METHOD, SYSTEM, AND APPARATUS FOR RELEASING STORAGE IN A FAST REPLICATION ENVIRONMENT

(75) Inventor: John Allen Hulsey, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/409,269

(22) Filed: Apr. 8, 2003

(65) Prior Publication Data

US 2004/0205311 A1    Oct. 14, 2004

(51) Int. Cl.
*G06F 12/00* (2006.01)

(52) U.S. Cl. .................. 711/162; 711/112; 711/156; 707/203; 707/204

(58) Field of Classification Search ............... 711/162, 711/156, 112; 707/203, 204
See application file for complete search history.

(56) References Cited

U.S. PATENT DOCUMENTS

| | | | |
|---|---|---|---|
| 5,337,275 A | 8/1994 | Garner | 365/189.01 |
| 5,357,475 A | 10/1994 | Hasbun et al. | 365/218 |
| 5,455,944 A | 10/1995 | Haderle et al. | 395/600 |
| 5,457,658 A | 10/1995 | Niijima et al. | 365/218 |
| 5,471,604 A | 11/1995 | Hasbun et al. | 395/404 |
| 5,561,786 A | 10/1996 | Morse | 395/497.01 |
| 5,581,723 A | 12/1996 | Hasbun et al. | 395/430 |
| 5,740,395 A | 4/1998 | Wells et al. | 395/430 |
| 5,813,042 A | 9/1998 | Campbell et al. | 711/159 |
| 5,822,781 A | 10/1998 | Wells et al. | |
| 5,930,815 A | 7/1999 | Estakhri et al. | 711/103 |
| 5,933,834 A | 8/1999 | Aichelen | 707/103 |
| 5,933,845 A | 8/1999 | Kopp et al. | 711/103 |
| 6,023,744 A | 2/2000 | Shoroff et al. | 711/4 |
| 6,038,636 A | 3/2000 | Brown, III et al. | 711/103 |
| 6,076,148 A * | 6/2000 | Kedem | 711/162 |
| 6,128,630 A | 10/2000 | Shackelford | 707/204 |
| 6,145,051 A | 11/2000 | Estakhri et al. | 711/103 |
| 6,223,308 B1 | 4/2001 | Estakhri et al. | 714/42 |
| 6,247,024 B1 | 6/2001 | Kincaid | 707/204 |
| 6,256,642 B1 | 7/2001 | Krueger et al. | 707/205 |
| 6,324,631 B1 | 11/2001 | Kuiper | 711/170 |
| 6,329,985 B1 | 12/2001 | Tamer et al. | 345/356 |
| 6,792,518 B1 * | 9/2004 | Armangau et al. | 711/162 |

* cited by examiner

*Primary Examiner*—Matthew D. Anderson
*Assistant Examiner*—Hetul Patel
(74) *Attorney, Agent, or Firm*—Kunzler & Associates

(57) ABSTRACT

Regions of data storage involved with fast replication relationships are managed and tracked in order to maintain the integrity of the data on the source and target volumes. In response to a delete operation referencing specified regions of storage, pending fast replication transfers are completed for source regions, fast replication relationships within the specified regions are withdrawn, and the specified regions of storage are release for subsequent allocation and reuse. The present invention facilitates maintaining synchronization of the storage management components of operating systems with the fast replication mechanisms of storage controllers, and releases unused storage regions for subsequent use. A storage subsystem may receive a delete command and make a determination of whether to release the specified regions of storage according to a state of a fast replication relationship with the regions of storage.

14 Claims, 6 Drawing Sheets

600a

| 602 | 4 | | | | | | | |
|---|---|---|---|---|---|---|---|---|
| 604 | 17 | | | | | | | |
| 606 | 37 | | | | | | | |
| 608 | 0 | 0 | 0 | 0 | 0 | 0 | 0 | 0 |
|  | 0 | 0 | 1 | 1 | 1 | 1 | 1 | 1 |
| 609 | 1 | 1 | 1 | 1 | 1 | - | - | - |

600b

| 602 | 4 | | | | | | | |
|---|---|---|---|---|---|---|---|---|
| 604 | 82 | | | | | | | |
| 606 | 102 | | | | | | | |
| 608 | 0 | 0 | 0 | 0 | 0 | 0 | 0 | 0 |
|  | 0 | 0 | 1 | 1 | 1 | 1 | 1 | 1 |
| 609 | 1 | 1 | 1 | 1 | 1 | - | - | - |

Fig. 6

METHOD, SYSTEM, AND APPARATUS FOR RELEASING STORAGE IN A FAST REPLICATION ENVIRONMENT

BACKGROUND OF THE INVENTION

1. The Field of the Invention

The invention relates to methods, apparatus, and systems for managing storage sub-systems and networks. Specifically, the invention relates to methods, apparatus, and systems for managing Fast Replication capable storage subsystems and networks.

2. The Relevant Art

Data processing systems often work with large amounts of data and require mechanisms to manage the storage and archiving of that data. For example, transaction processing systems typically access large databases and log results such as transaction records at a very high rate. The ability to quickly and reliably copy data from one storage area to another enables the deployment of efficient and reliable high-performance processing applications and systems.

Fast replication techniques such as IBM's Flashcopy™ technology have been developed in response to the need for efficient copying mechanisms within high-performance processing systems. A fast replication operation gives the appearance of an instantaneous copy, while the actual transfer of data is conducted as a background process, or is deferred until the data to be copied is about to be overwritten. With fast replication techniques, applications may conduct data snapshots (point-in-time copies) and continue processing rather than suspending operation while the data transfers occur.

In addition to increased performance, fast replication capable systems simplify the code complexity of I/O intensive processes such as those conducted on large mainframe systems and the like. System performance may also be increased in that support for fast replication operations may be provided by low-level drivers and devices that are optimized for performance.

Fast replication capable systems preferably support multiple concurrent fast replication data transfers. Since the data transfer may be deferred indefinitely, the act of initiating a fast replication operation between a source and a target volume is often referred to as "establishing a fast replication relationship." Likewise, canceling a pending fast replication transfer may be referred to as "withdrawing a fast replication relationship."

Without support for fast replication relationships, conducting a point-in-time copy often requires that a system suspend all tasks that access a source and/or target device. Since many systems do not have explicit knowledge of the devices that will be accessed by each task, those systems require suspension of all tasks except for the task conducting the actual fast replication operations. Suspension of the various tasks or processes in order to conduct fast replication operations greatly reduces the performance of multi-tasking systems.

One challenge of fast replication capable systems, particularly those systems capable of establishing multiple simultaneous fast replication relationships on a sub-volume basis, is maintaining synchronization between tasks conducting fast replication operations and the memory management or storage management processes of the operating system. Memory involved in a fast replication relationship cannot be safely allocated to other tasks until the actual data transfer has concluded. As a result, deleting data on fast replication capable storage subsystems typically requires mechanisms for detecting whether specific regions are involved in a fast replication relationship and whether the data transfers related to the fast replication relationship have occurred. Such means and methods place a heavy burden on the memory management or storage management processes of the operating system and typically reduce the performance of data processing systems, especially in systems where multiple fast replication processes may be occurring simultaneously.

Therefore, what is needed are methods and apparatus for managing storage that facilitate reuse of storage regions involved in a fast replication relationship and maintain synchronization with the storage management processes of the operating system. Specifically, methods and apparatus are needed that ensure safe withdrawal of any fast replication relationships active within specified regions of storage. Such methods and apparatus would preferably operate at a sub-volume level in a manner that is efficient, reliable, and straightforward to implement.

SUMMARY OF THE INVENTION

The methods, apparatus, and systems of the present invention have been developed in response to the present state of the art, and in particular, in response to the problems and needs in the art that have not yet been fully solved by currently available fast replication means and methods. Accordingly, the present invention provides an improved method, apparatus, and system for managing data storage involved in fast replication operations and relationships.

In accordance with the invention as embodied and broadly described herein, an improved method, apparatus, and system are presented for managing fast replication capable data storage. The improved method, apparatus, and system maintain the integrity of storage devices in light of fast replication operations, release unneeded regions of storage for subsequent use, and maintain synchronization with storage management components such as those associated with the operating system of a server or host.

In one aspect of the invention, a method for managing fast replication capable storage includes allocating regions of storage to a task, establishing a fast replication relationship for specified regions of allocated storage, withdrawing the fast replication relationship for the specified regions, for example in response to deletion of a file or dataset, and releasing the specified regions of allocated storage for subsequent use.

The method for managing fast replication capable storage may be conducted in conjunction with a storage management module within a system utility or operating system and one or more controllers within a storage subsystem. The method may be used with various units of storage such as tracks, cylinders, sectors, and blocks.

In certain embodiments, establishing and withdrawing a fast replication relationship is accomplished by communicating with one or more storage controllers which handle and track fast replication relationships within a storage subsystem. In one embodiment, the communications include extents that specify a contiguous area of storage via a starting and ending index for the starting and ending regions of storage.

In another aspect of the invention, a method for controlling storage devices includes tracking regions of storage involved in fast replication relationships, receiving communication referencing specified regions to be released for subsequent use, and withdrawing fast replication relationships for the specified regions. The method may also include transferring data within the specified regions to a target device previous to withdrawing the fast replication relationships, and informing a storage management module that the specified regions can be released for subsequent use.

In one embodiment, tracking regions of storage involved in fast replication relationships and withdrawing fast replication relationships comprises marking and unmarking regions of storage. Marking and unmarking may be conducted by setting and resetting flags indicating that a data transfer is pending for the associated storage region.

In another aspect of the invention, an apparatus for controlling fast replication capable storage devices, includes a tracking module configured to track regions involved in a fast replication relationship, and a transfer module configured to transfer data stored within regions involved in a fast replication relationship to a target device. The tracking module is further configured to withdraw the fast replication relationship for specified regions, for example in response to communications received from a storage management module executing on a server or host. The tracking module may also be configured to inform a storage management module that the specified regions can be released for subsequent use.

In another aspect of the invention, a system for managing fast replication capable storage includes a storage management module executing on a server or host that is configured to allocate storage, initiate establishment of fast replication relationships, and initiate withdrawal of fast replication relationships, and a controller configured to control storage devices, establish fast replication relationships for specified regions of storage, and withdraw fast replication relationships for specified regions of storage as directed by the storage management module. The storage management module may also be configured to release the specified regions of storage for subsequent use. The system for managing fast replication capable storage reduces the processing burden associated with managing fast replication capable storage.

The present invention facilitates deleting data within sub-volume storage regions while maintaining synchronization with the storage management components such as those residing on the host and the fast replication tracking components such as those residing in a storage subsystem. In one embodiment maintaining synchronization comprises sending a dataspace delete command to a storage subsystem which completes selected data transfers in order to maintain integrity of the storage subsystem. In the aforementioned embodiment, data transfers involving data regions that are the source of a fast replication relationship are completed, while transfers involving data regions that are the destination of a fast replication relationship are abandoned.

The present invention facilitates relegating tedious housekeeping tasks and data transfers related to fast replication operations to one or more storage controllers within a storage subsystem. Storage regions may be fixed-sized units such as blocks, sectors, cylinders or tracks. Variable length units such as files or datasets may also be used. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is an illustration depicting a data structure in accordance with the present invention.

DETAILED DESCRIPTION OF THE PREFERRED EMBODIMENTS

Figure 1:
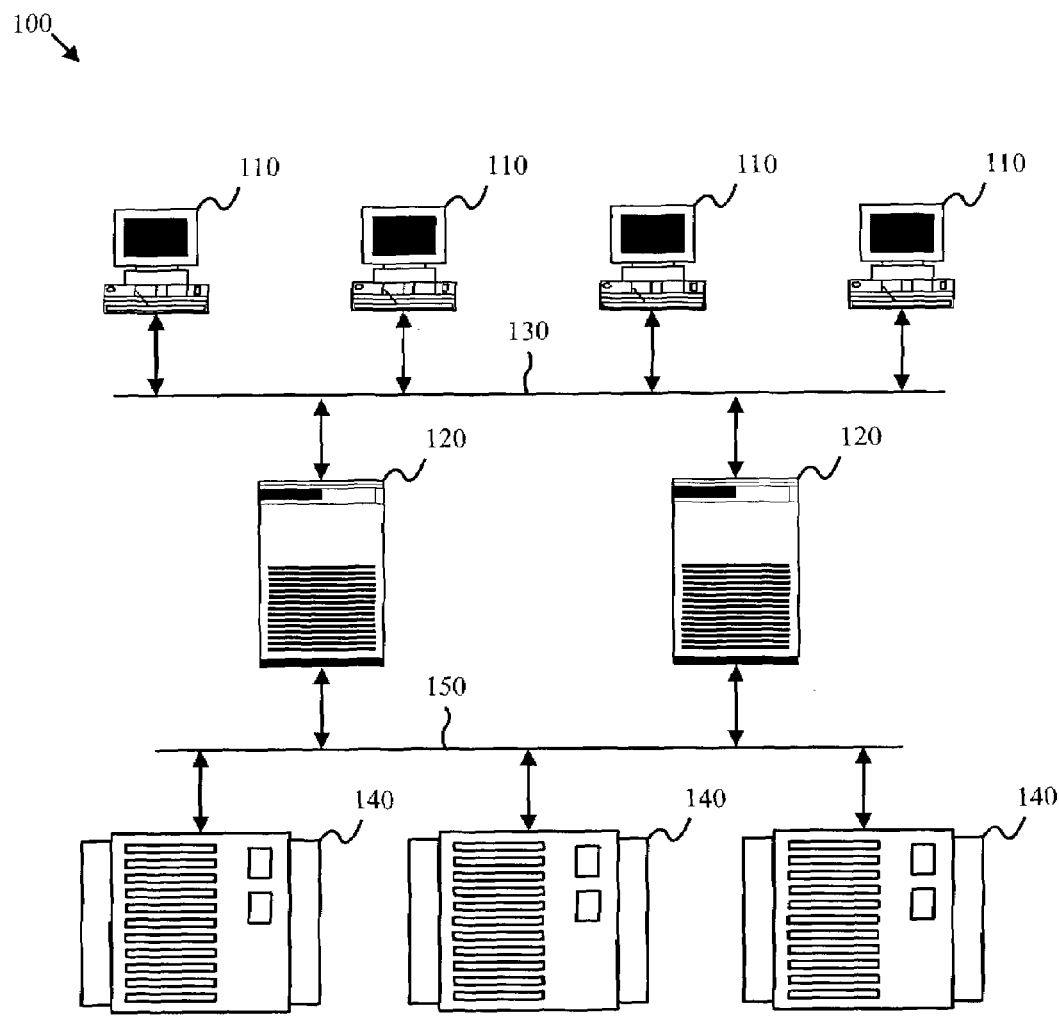
FIG. 1 is a block diagram illustrating a network system representative of the environment wherein the present invention may be deployed.

Referring to FIG. 1, a network system 100 is representative of the environment wherein the present invention may be deployed. The depicted network system 100 includes workstations 110 and servers 120 interconnected via a network 130. The network 130 may comprise a local area network and/or a wide area network.

The depicted network system 100 also includes one or more storage arrays 140 interconnected with the servers 120 via a storage network 150. In one embodiment, the servers 120 are mainframe computers configured to conduct high bandwidth I/O with the storage arrays 140.

Figure 2A:
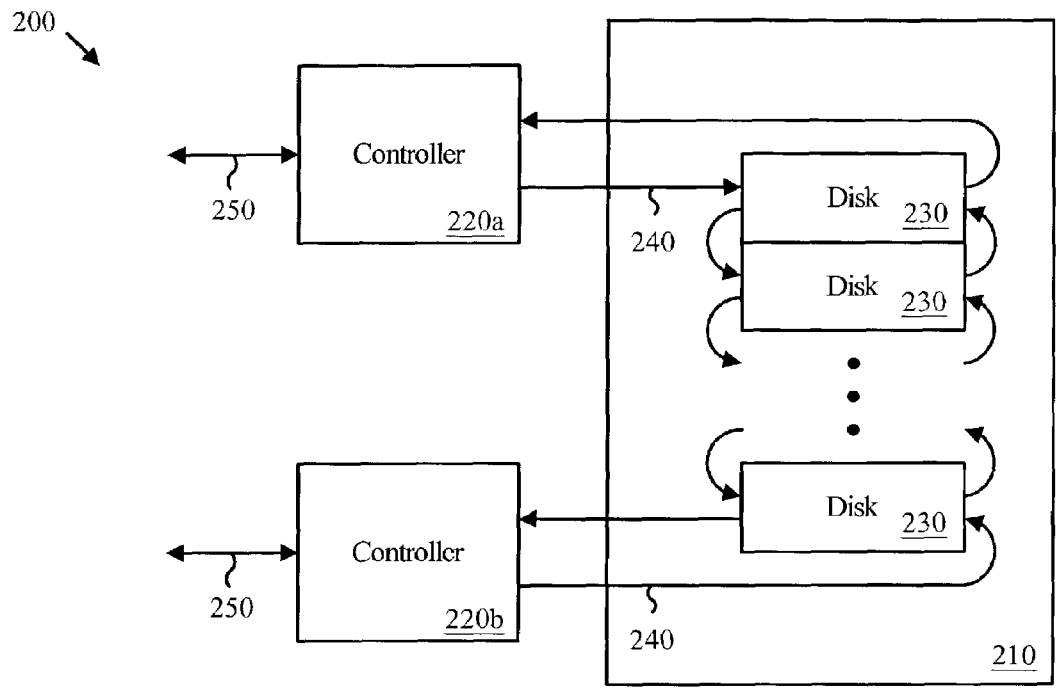
FIG. 2a is a block diagram illustrating a storage array representative of the environment wherein the present invention may be deployed.

FIG. 2a is a schematic block diagram of a storage sub-system 200 illustrating the need of the present invention. The storage sub-system 200 is a representative example of sub-systems wherein the present invention may be deployed and is one example of the storage array 140 depicted in FIG. 1. The storage sub-system 200 includes a storage array 210 and one or more controllers 220. In one example, the storage array 210 may include a RAID configuration. The storage sub-system 200 may include a plurality of controllers 220 that achieve increased reliability through redundancy. Additionally, the storage array 210 may also achieve increased reliability by interconnecting multiple storage devices 230 via an array loop 240.

In the depicted embodiment, the storage devices 230 are interconnected with an array loop 240. The array loop 240 also interconnects the controllers 220 with the storage array. The array loop 240 circulates communications in both directions to increase reliability and throughput. In one embodiment, the array loops 240 are point-to-point loops such as those defined by the fibre channel standard.

In the depicted embodiment, the controllers 220 each support a host connection 250. The controllers 220 receive access requests via the host connection 250 and service those requests by transferring blocks of data to and from the storage array 210. The blocks of data that are transferred to the storage array 210 may be redundantly encoded to permit error detection and data recovery in the event of failure of one of the storage devices 230. Typically, the controllers 220 organize the storage devices 230 in a redundant manner and present one or more volumes for use by a one or more servers or hosts such as those depicted in FIG. 1.

In addition to connection and data redundancy, the controllers 220 may support various types of fast replication operations. Fast replication operations provide the appearance of an instant copy between a source volume and a target volume within a storage sub-system such as the storage sub-system 200. Fast replication operations conduct data transfers from the source volume to the target volume at the convenience of the storage sub-system 200 without halting access to the source or target volumes by an external device, such as a host or server.

The challenge of conducting fast replication operations and their associated background copies is in maintaining the integrity of the source and target volumes in light of read, write, and delete operations to the source and target volumes. Conducting fast replication operations is particularly challenging if fast replication operations are conducted on a sub-volume level and multiple operations are conducted simultaneously. The present invention was developed in response to the challenges of deleting data within fast replication capable storage sub-systems and networks.

Figure 2B:
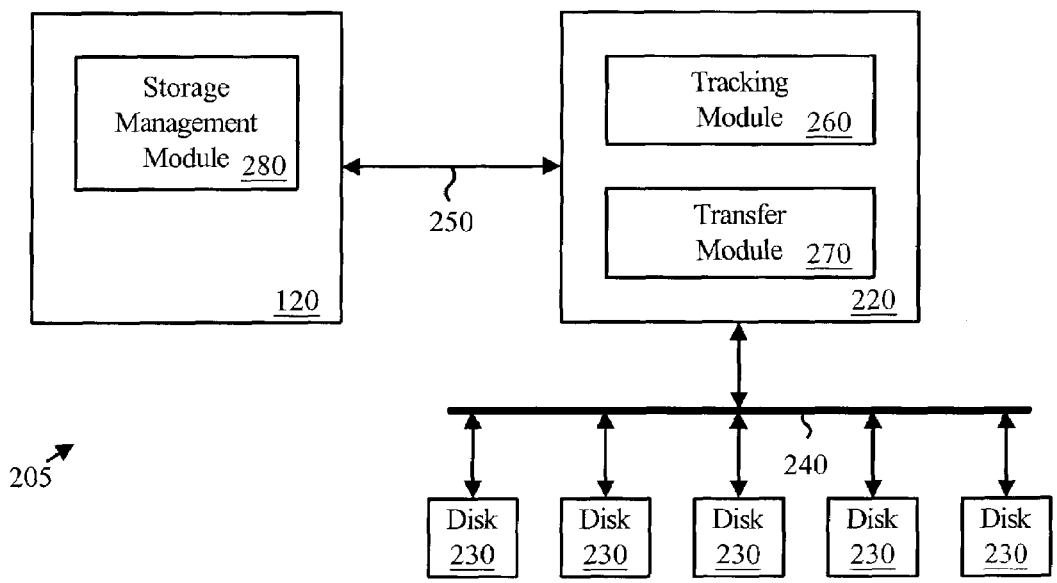
FIG. 2b is a block diagram illustrating a fast replication compatible storage management system of the present invention.

Referring to FIG. 2b, a fast replication compatible storage system 205 includes a fast replication capable controller 220, and a server or host 120 with a storage management module 280, and one or more storage devices 230.

The fast replication capable controller 220 facilitates copying data from a source device to a target device in a manner that appears instantaneous. The controller 220 includes a transfer module 260 that enables the transfer of data between and within devices, and a tracking module 270 that tracks the movement and placement of the data. In one embodiment, the modules of the controller 220 are software modules configured to conduct their designated tasks.

In one embodiment, the modules of the controller 220 manage data within fixed-sized regions of storage on the storage devices 230 such as sectors, cylinders, or tracks. In certain embodiments, the devices 230 managed by the described modules of the controller 220 are logical devices or volumes, wherein the data is distributed across multiple physical devices in a redundant manner.

The transfer module 260 coordinates data transfers between source and target devices. In one embodiment, the transfer module 260 conducts handshaking with the storage devices 230 in a manner that validates the reliability of data transfers.

The tracking module 270 tracks the movement and placement of data involved in fast replication operations. In one embodiment, the tracking module 270 uses bit flags to mark and unmark regions containing data involved with fast replication operations. The bit flags enable reliable fast replication operations including fast replication delete operations. The operations conducted by the tracking module 270 will be described in more detail in conjunction with FIGS. 4–6.

Figure 3:
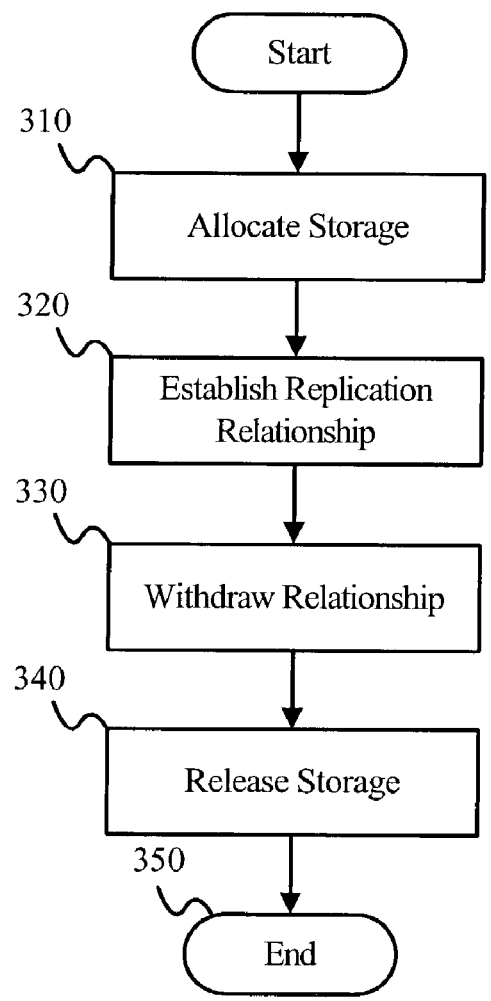
FIG. 3 is a flow chart illustrating a storage management method of the present invention.

FIG. 3 is a flow chart illustrating a storage management method 300 of the present invention. The storage management method 300 manages storage in a manner that is compatible with conducting fast replication operations and maybe conducted in conjunction with a storage manager such as the storage management module 280 and a storage controller such as the storage controller 220. As depicted, the storage management method 300 includes an allocate storage step 310, an establish relationship step 320, a withdraw relationship step 330, and a release storage step 340.

The allocate storage step 310 allocates memory on a storage device to an application or task requiring the memory. The allocated storage may be virtual memory provided to an application or task that is managed in conjunction with a cache memory residing on a server or host (not shown).

In response to a request by an application, task, system utility or the like, the establish relationship step 320 establishes a fast replication relationship on part or all of the allocated storage. Establishing a fast replication relationship facilitates conducting a point-in-time copy as either a deferred data transfer or a background transfer process. The allocated storage assigned to a fast replication relationship may be the source or destination of a fast replication relationship and the associated data transfer.

The established fast replication relationship step 320 and associated mechanisms maintain the integrity of the source and target volumes or devices in light of read, and write operations to the allocated storage. Additional details on mechanisms for conducting fast replication operations and maintaining fast replication relationships are discussed in conjunction with FIGS. 4–6.

In response to a delete request by an application, task, system utility, or the like, the withdraw relationship step 330 withdraws the fast replication relationship established in step 320. In certain embodiments, the withdraw relationship step 330 involves sending a withdraw request to one or more storage controllers which determine which actions are necessary to fulfill the request. The storage controllers in turn, complete the necessary actions and in one embodiment send an acknowledgment message indicating that the requested withdrawal has been completed. One embodiment of the withdraw relationship step 330 is describe in more detail in conjunction with FIG. 5.

In one embodiment, the withdraw relationship step 330 comprises sending a dataspace delete command to a storage subsystem which determines the state of fast replication relationships involving the target memory and selectively completes selected data transfers in order to maintain integrity of the storage subsystem. In the aforementioned embodiment, data transfers involving data regions that are the source of a fast replication relationship are completed, while transfers involving data regions that are the destination of a fast replication relationship are abandoned.

Subsequent to the withdraw relationship step 330, the method 300 proceeds to the release storage step 340. The release storage step 340 releases the storage involved in the fast replication relationship. Releasing the storage involved in the fast replication relationship frees the involved storage for subsequent allocation and reuse.

The depicted storage management method 300 facilitates coordinated management of storage involved in fast replication relationships in a straightforward manner. The elements or steps of the method 300 can be distributed to run on various storage related components of a data processing system in order to increase system performance and robustness. For example, the withdrawal of a fast replication relationship may be conducted by a storage controller or the like that is in the best position to ascertain the actions necessary to fulfill the request. The processing burden on the storage management components of a host can be reduced and fast replication tracking mechanisms such as those that execute on a storage controller or the like may be synchronized with the storage allocation mechanisms executing on the host.

Figure 4:
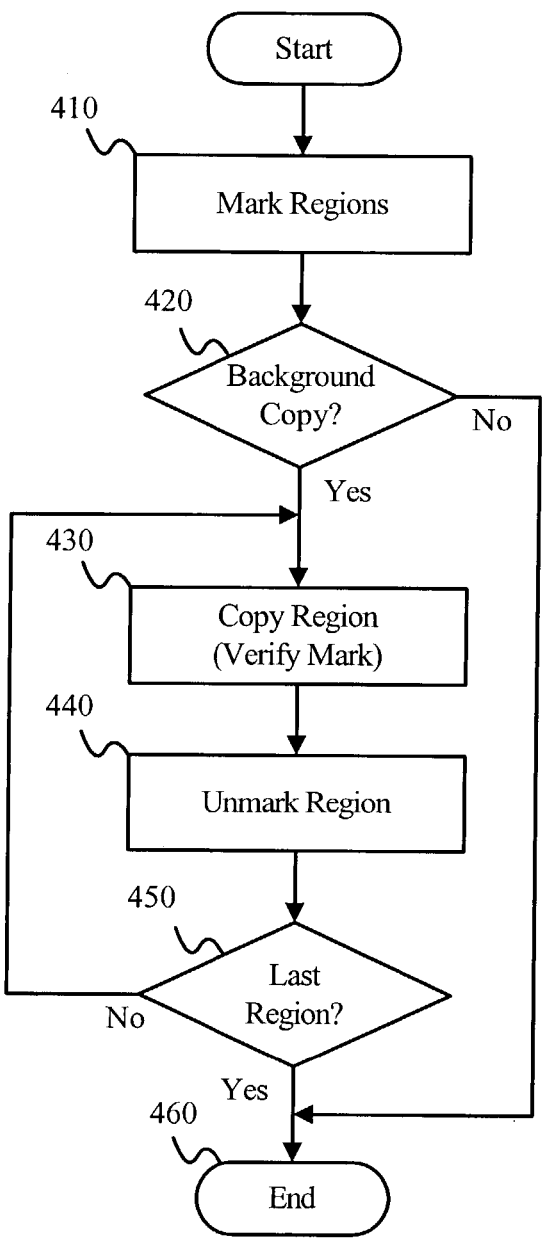
FIG. 4 is a flow chart illustrating an establish relationship method of the present invention.

FIG. 4 is a flow chart illustrating an establish relationship method 400 in accordance with the present invention. The establish relationship method 400 facilitates conducting multiple fast replication operations on sub-volume regions and may be used to implement the establish relationship step 320 described in conjunction with FIG. 3. In one embodiment, the establish relationship method 400 is conducted on the storage controller 220 in conjunction with the storage management module 280 depicted in FIG. 2*b*.

The depicted establish relationship method 400 includes a mark regions step 410, a background copy test 420, a copy region step 430, an unmark region step 440, and a last region test 450. The mark regions step 410 designates which regions are earmarked for transfer to the target volume.

In one embodiment, the mark regions step 410 comprises setting a copy flag for each region that is designated for transfer to the target volume. The copy flags are set to a value indicating a data transfer operation is required for the marked region. In another embodiment, the mark regions step 410 comprises initializing a pair of registers wherein one register corresponds to the first region designated for transfer (within a contiguous set of regions) and the other register corresponds to the last region designated for transfer.

The depicted establish relationship method 400 proceeds from the mark regions step 410 to the background copy test 420. The background copy test 420 ascertains whether a background copy has been requested, for example, by the application or utility that invoked the fast replication command. If a background copy has been requested, the method proceeds to the copy regions step 430. If no background copy has been requested, the method ends 460.

The copy regions step 430 initiates the transfer of the data within a marked region to a corresponding region on the target volume. In one embodiment, the source volume and the target volume may be the same volume. In response to initiating the data transfer, the method 400 proceeds to the unmark region step 440.

The unmark region step 440 is conducted to indicate that a data transfer is no longer needed. In one embodiment, the unmark region step 440 comprises receiving an acknowledgement from the target volume that the data transfer has occurred, followed by a clearing operation to clear the copy flag and thereby indicate that a data transfer is no longer required. The depicted establish relationship method 400 then proceeds to the last region test 450.

The last region test 450 ascertains whether all of the designated regions have been transferred to the target volume. In one embodiment, ascertaining comprises checking the copy flags to determine if any transfers are still required. In another embodiment, such ascertaining comprises comparing an index for the region just transferred to the target volume with a register containing the last region designated for transfer. If less than all of the designated regions have been transferred to the target volume, the establish relationship method 400 loops to the copy region step 430, otherwise, the method ends 460.

The described establish relationship method 400 is typically conducted by a controller such as the controller 200 in response to receiving a fast replication command. For example, in one embodiment an operating system executing on a host invokes the fast replication command via an I/O command block that contains values identifying the source and target volumes and extents. The I/O command block is sent to the controller 200 in response to a fast replication function call invoked by a system utility or application.

Figure 5:
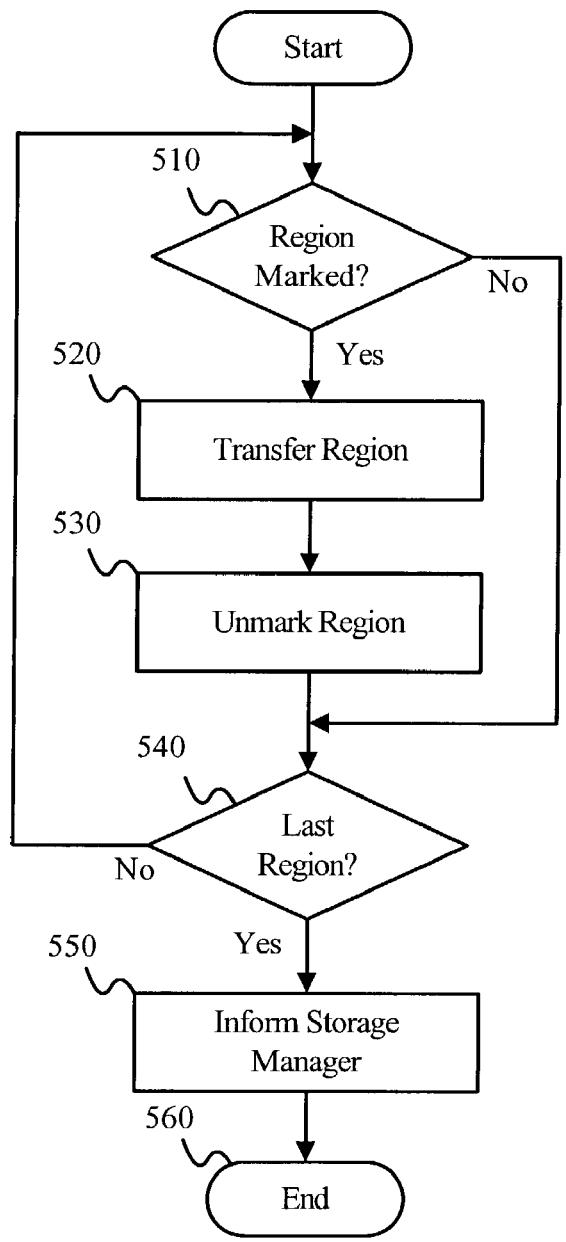
FIG. 5 is a flow chart illustrating a withdraw relationship method of the present invention.

FIG. 5 is a flow chart illustrating a withdraw relationship method 500 of the present invention. The withdraw relationship method 500 is one example of the withdraw relationship step 330 depicted in FIG. 3. In one embodiment, the withdraw relationship method 500 is conducted in response to reception of a dataspace delete command from a host.

The withdraw relationship method 500 ensures data integrity on the source and target volumes of a fast replication relationship when deleting data within a fast replication capable storage subsystem and facilitates releasing deleted regions for subsequent use. The withdraw relationship method 500 may be conducted in conjunction with the establish relationship method 400 and may use the same mechanisms for marking and unmarking regions.

In one embodiment, the withdraw relationship method 500 progresses sequentially through a set of specified regions, checks if each region has been copied to the target volume, transfers and unmarks those regions which need to be copied, and releases the specified regions for subsequent use. In one embodiment, the regions are specified by extents associated with a file or datatset.

The depicted method 500 includes a region marked test 510, a transfer region step 520, an unmark region step 530, a last region test 540, and an inform storage manager step 550. The region marked test 510 ascertains whether a region has been copied, for example, by the establish relationship method 400, to the target volume. In one embodiment, ascertaining includes testing whether a copy flag is still set for the region. If the copy flag is no longer set, the region has been copied to the target volume. If the region has been copied to the target volume, the method 500 skips to the last region test 530. If the region has not been copied, the method 500 proceeds to the transfer region step 520.

If the storage region is the source of a fast replication relationship, the transfer region step 520 transfers the region to the target device or volume. Since the depicted method 500 is conducted in response to a delete operation, the transfer region step 520 need not be conducted for storage regions that are the target of a fast replication relationship.

After the transfer region step 520, the method 500 proceeds to the unmark region step 530. Unmarking the region prevents redundant copying of the region, for example, by the establish relationship method 400, which, in certain embodiments, may be executing concurrently with the withdraw relationship method 500. In embodiments with concurrent processes that mark and unmark regions, standard concurrent process access mechanisms, such as test and set mechanisms, or the like, are preferably deployed in order to maintain the integrity of branching decisions within the concurrent processes.

The last region test 540 ascertains whether all of the regions have been processed. In one embodiment, the last region test 540 comprises testing a looping variable. If additional regions need to be processed, the method 500 loops to the region marked test 510. If no more regions need to be processed, the method proceeds to the inform storage manager step 550.

The inform storage manager step 550 is a step that informs the storage manager that the fast replication relationship for the specified regions has been withdrawn and the specified regions may be released for subsequent reuse. Upon completion of the inform storage manager step 550, withdraw relationship method 500 ends 560.

The withdraw relationship method 500 does what is necessary to ensure that one or more specified storage regions may be release for subsequent use, for example in response to a delete operation referencing the specified regions. The method may be conducted by a storage controller, or the like, that is best situated to determine the status of fast replication operations within a storage subsystem.

FIG. 6 is an illustration depicting a data structure 600 in accordance with the present invention. The data structure 600 is intended to be exemplary of various embodiments and is shown with a source structure 600a for use with source volumes and a target structure 600b for use with target volumes. In situations where the source and target volumes are controlled by the same controller, the elements of the source structure 600a and the target structure 600b are preferably combined into a single structure wherein redundant elements are eliminated.

As depicted, the data structure 600 includes an extent ID 602, an extent start 604, an extent end 606, and a marking means 608 comprised of copy flags 609. The extent ID 602 uniquely identifies which extent the data structure 600 pertains to. The extent start 604 and the extent end 606 define the bounds of the extent on the source or target volume.

The marking means 608 provides means for tracking which regions have a pending copy operation. In the depicted embodiment, the marking means 608 comprises a set of copy flags 609 corresponding to each region within the bounds of the extent start 604 and the extent end 606. In the example shown, completed copies are indicated with a '0' value and pending copies are indicated with a '1' value. Several of the copy flags are shown with a dash symbol ('-') indicating bits that do not correspond to regions within the extent and therefore are not used as flags in the depicted example.

The establish relationship method 400 and the withdraw relationship method 500 may use the data structure 600 to control data transfers and release storage regions involved in fast replication operations. The methods 400 and 500 facilitate conducting read, write, and delete operations on a sub-volume level while maintaining data integrity in the presence of pending fast replication transfers. The methods may be conducted in conjunction with various types of storage devices, for example rotational storage means such as magnetic and optical storage devices, or semiconductor storage means such as flash memory, and random access memory. The methods 400 and 500 also enable data relocation in that fast replication data may be located at different positions or locations on the source and target devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing fast replication-capable storage, the method comprising:
    allocating regions of storage to provide allocated storage;
    establishing a fast replication relationship for specified regions of the allocated storage;
    communicating a message to a storage server to release a specified region of allocated storage for future use, the message sufficient for the storage server to select an operation on the specified region of allocated storage according to a state of the fast replication relationship of the specified region of allocated storage;
    starting a background copy when the specified regions comprise the source of a fast replication operation and the specified region is not available for copying;
    withdrawing the fast replication relationship when a copy completes when the specified regions comprise the source of a fast replication operation and the specified region is available for copying;
    withdrawing the fast replication relationship when the specified regions comprise the target of the fast replication relationship; and
    taking no action when the specified regions are not part of a fast replication relationship.

2. The method of claim 1, wherein the operation comprises releasing the allocated storage for subsequent use.

3. The method of claim 1, wherein communicating from a host to the storage server comprises issuing a dataset delete command to a storage subsystem.

4. The method of claim 1, wherein the message comprises extents that identify a contiguous area of storage.

5. The method of claim 1, wherein the specified regions of storage comprise units selected from the group consisting of tracks, cylinders, sectors, and blocks.

6. A method for controlling storage devices, the method comprising:
    receiving communication referencing specified regions involved in fast replication relationships to be released for subsequent use; and
    selecting an operation to be conducted for the specified regions according to a state of a fast replication relationship with the specified regions;
    starting a background copy when the specified regions comprise the source of a fast replication operation and the specified region is not available for copying;
    withdrawing the fast replication relationship when a copy completes when the specified regions comprise the source of a fast replication operation and the specified region is available for copying;
    withdrawing the fast replication relationship when the specified regions comprise the target of the fast replication relationship; and
    taking no action when the specified regions are not part of a fast replication relationship.

7. The method of claim 6, further comprising transferring data within the specified regions to a target device previous to withdrawing the fast replication relationship.

8. The method of claim 6, further comprising informing a storage management module that the specified regions can be released for subsequent use.

9. The method of claim 6, further comprising tracking regions of storage involved in fast replication relationships.

10. The method of claim 9, wherein tracking regions of storage involved in a fast replication relationship and withdrawing the fast replication relationship comprises marking and unmarking regions of storage.

11. The method of claim 6, wherein the communication referencing the specified regions to be released for subsequent use is provided by a storage management module residing on a host.

12. The method of claim 6, wherein the communication referencing the specified regions comprises extents that identify a contiguous area of storage.

13. The method of claim 6, wherein the regions of storage comprise units selected from the group consisting of tracks, cylinders, sectors, and blocks.

14. A computer readable storage medium comprising computer readable program code for managing storage involved in a fast replication relationship, the program code configured to:
    track regions of storage involved ma fast replication relationship; and
    selectively withdraw the fast replication relationship for specified regions upon receipt of a message from a storage server to release allocated storage for future use, and based upon a determination of a state of a fast replication relationship with the specified regions of the allocated storage start a background copy when the specified regions comprise the source of a fast replication operation and the specified region is not available for copying;

withdraw the fast replication relationship when a copy completes when the specified regions comprise the source of a fast replication operation and the specified region is available for copying;

withdraw the fast replication relationship when the specified regions comprise the target of the fast replication relationship; and take no action when the specified regions are not part of a fast replication relationship.

* * * * *

UNITED STATES PATENT AND TRADEMARK OFFICE
CERTIFICATE OF CORRECTION

| | |
|---|---|
| PATENT NO. | : 7,032,090 B2 |
| APPLICATION NO. | : 10/409269 |
| DATED | : April 18, 2006 |
| INVENTOR(S) | : John Allen Hulsey |

It is certified that error appears in the above-identified patent and that said Letters Patent is hereby corrected as shown below:

<u>Column 10</u>
Line 64, "involved ma fast" should read --involved in a fast--

Signed and Sealed this

Twenty-first Day of November, 2006

JON W. DUDAS
*Director of the United States Patent and Trademark Office*